United States Patent
Sodeyama et al.

(10) Patent No.: US 11,821,552 B2
(45) Date of Patent: Nov. 21, 2023

(54) HOSE CLAMP

(71) Applicant: PIOLAX, INC., Kanagawa (JP)

(72) Inventors: Ken Sodeyama, Kanagawa (JP); Ryosuke Hamada, Kanagawa (JP)

(73) Assignee: PIOLAX, INC., Kanagawa (JP)

( * ) Notice: Subject to any disclaimer, the term of this patent is extended or adjusted under 35 U.S.C. 154(b) by 469 days.

(21) Appl. No.: 17/266,000

(22) PCT Filed: Aug. 5, 2019

(86) PCT No.: PCT/JP2019/030778
§ 371 (c)(1),
(2) Date: Feb. 4, 2021

(87) PCT Pub. No.: WO2020/031981
PCT Pub. Date: Feb. 13, 2020

(65) Prior Publication Data
US 2021/0164596 A1    Jun. 3, 2021

(30) Foreign Application Priority Data
Aug. 8, 2018 (JP) .................. 2018-149573

(51) Int. Cl.
*F16L 33/03* (2006.01)
(52) U.S. Cl.
CPC .................... *F16L 33/03* (2013.01)
(58) Field of Classification Search
CPC ........ F16L 33/021; F16L 33/03; F16L 33/035
See application file for complete search history.

(56) References Cited

U.S. PATENT DOCUMENTS

| 4,425,682 A | 1/1984 | Hashimoto et al. |
| 5,819,376 A | 10/1998 | Kovalsky et al. |

(Continued)

FOREIGN PATENT DOCUMENTS

| DE | 3832875 C1 * | 8/1989 | |
| EP | 1087165 A2 * | 3/2001 | .............. F16L 33/03 |

(Continued)

OTHER PUBLICATIONS

Sep. 10, 2019, International Search Report for related PCT application No. PCT/JP2019/030778.

(Continued)

*Primary Examiner* — Zachary T Dragicevich
*Assistant Examiner* — James A Linford
(74) *Attorney, Agent, or Firm* — Paratus Law Group, PLLC

(57) ABSTRACT

There is provided a hose clamp, including a plate spring body and a pair of tab portions. The plate spring body has a base portion, and arm portions. A first overlap portion and a second overlap portion are formed at the arm portions, and in a state where a diameter of the plate spring body is reduced, the first overlap portion and the second overlap portion overlap with each other in the circumferential direction of the plate spring body. Engagement portions are provided on facing surfaces of the pair of tab portions respectively, the engagement portions holding the plate spring body in a state where the diameter of the plate spring body is expanded. The engagement portions are provided at positions closer to side edge portions being opposite to facing side edge portions of the overlap portions than to the facing side edge portions.

3 Claims, 12 Drawing Sheets

(56) References Cited

U.S. PATENT DOCUMENTS

| | | |
|---|---|---|
| 6,038,744 A | 3/2000 | Zielinski |
| 2009/0188085 A1 | 7/2009 | Serbu et al. |
| 2013/0291345 A1 | 11/2013 | Nakamura |
| 2014/0068897 A1 | 3/2014 | Nakamura |
| 2016/0264327 A1 | 9/2016 | Nakamura |
| 2017/0334620 A1 | 11/2017 | Nakamura |

FOREIGN PATENT DOCUMENTS

| | | | | |
|---|---|---|---|---|
| FR | 2741419 A1 | * | 5/1997 | ............ F16L 33/03 |
| JP | S49-118423 U | | 10/1974 | |
| JP | S57-025592 A | | 2/1982 | |
| JP | S62-184281 U | | 11/1987 | |
| JP | H10-318474 A | | 12/1998 | |
| JP | 2005273914 A | * | 10/2005 | |
| WO | WO-2007108155 A1 | * | 9/2007 | ............ F16L 33/03 |
| WO | WO 2012/095990 A1 | | 7/2012 | |
| WO | WO 2015/063906 A1 | | 5/2015 | |
| WO | WO 2017/145311 A1 | | 8/2017 | |

OTHER PUBLICATIONS

Sep. 10, 2019, International Search Opinion for related PCT application No. PCT/JP2019/030778.
Aug. 11, 2020, International Written Opinion issued for related PCT application No. PCT/JP2019/030778.

* cited by examiner

HOSE CLAMP

CROSS REFERENCE TO PRIOR APPLICATION

This application is a National Stage Patent Application of PCT International Patent Application No. PCT/JP2019/030778 (filed on Aug. 5, 2019) under 35 U.S.C. §371, which claims priority to Japanese Patent Application No. 2018-149573 (filed on Aug. 8, 2018), which are all hereby incorporated by reference in their entirety.

TECHNICAL FIELD

The present invention relates to a hose clamp used for connecting pipings of an automobile by using a hose, for example.

BACKGROUND ART

In the related art, in connecting pipings of an automobile by using a hose, a method is widely used in which a flexible hose is put on outer peripheries of end portions of pipings having a pipe shape and further an outer periphery of the hose is fastened with a hose clamp, thereby fixing the hose to the pipings.

For example, the following Patent Literature 1 discloses a hose band that has a hose band body bent in a substantially cylindrical shape and a first tab piece and a second tab piece provided at both ends of the hose band body. On both sides of the hose band body, narrow portions formed at substantially the same width are provided at positions in point symmetry, and a first locking claw extending inward in a thumb shape is formed on an inner side of one narrow portion and a second locking claw extending inward in a little finger shape is formed on an inner side of the other narrow portion (see paragraph [0011]). When the first locking claw and the second locking claw are engaged with each other, the hose band body is in a state where a diameter of the hose hand body is expanded, and when engagement between the first locking claw and the second locking claw is released, the hose band body is in a state where the diameter of the hose band body is reduced and the hose is fastened and fixed.

CITATION LIST

Patent Literature

Patent Literature 1: JP-A-H10-318474

SUMMARY OF INVENTION

Technical Problem

In the hose band of Patent Literature 1, since the first locking claw and the second locking claw protrude respectively from the inner sides of the narrow portions provided on both sides of the hose band body that is to surround an outer periphery of a hose, a relatively large gap is formed between the inner side of one narrow portion and the inner side of the other narrow portion in a state where the locking claws are engaged with each other (see FIG. 7 of Patent Literature 1). The gap between the inner sides of the narrow portions is maintained even when the hose band body is in the state where the diameter of the hose band body is reduced after the engagement between the locking claws is released. As a result, a portion (portion fastened and fixed by the hose band body and the pair of narrow portions) to which a fastening pressure by the hose band made of metal greatly applies and a portion (gap portion between inner sides of the narrow portions) to which no fastening pressure applies, are generated and a surface pressure by the hose band becomes non-continuous. At the portion to which no fastening pressure applies, a fastening and fixing force for the hose and the pipe may decrease and performance of sealing between the hose and the pipe may decrease.

Accordingly, an object of the present invention is to provide a hose clamp that is capable of improving performance of sealing between a hose and a piping, pipe, or the like connected to the hose when the hose clamp is in a state where a diameter of the hose clamp is reduced.

Solution to Problem

In order to achieve the above object, the present invention provides a hose clamp, including: a plate spring body that is curved in an annular shape and that is to be attached so as to surround an outer periphery of a hose; and a pair of tab portions that are provided at both end portions of the plate spring body in a circumferential direction. A diameter of the plate spring body is reduced when the pair of tab portions are separated from each other and is expanded when the pair of tab portions are brought close to each other. The plate spring body has a base portion that extends by a predetermined length along a circumferential direction of the hose, a first arm portion that extends from one side of the base portion in an axial direction at one end side of the base portion in a circumferential direction, and a second arm portion that extends from the other side of the base portion in the axial direction at the other end side of the base portion in the circumferential direction. A first overlap portion and a second overlap portion are formed at tip end sides of the first arm portion and the second arm portion in an extending direction respectively. In a state where the diameter of the plate spring body is reduced, the first overlap portion and the second overlap portion are configured so as to overlap with each other in the circumferential direction of the plate spring body and, as viewing the plate spring body from a radial direction, not to overlap with each other in an axial direction of the plate spring body. The pair of tab portions are bent and extend outward in the radial direction of the plate spring body, from tip ends of the first arm portion and the second arm portion in the extending direction. Engagement portions are provided on facing surfaces of the pair of tab portions respectively, the engagement portions holding the plate spring body in a state where the diameter of the plate spring body is expanded when the pair of tab portions are brought close to each other in the circumferential direction and are brought close to each other in the axial direction. As viewing the plate spring body from the radial direction, the engagement portions are provided in the tab portions, at positions closer to side edge portions being opposite to facing side edge portions of the overlap portions of the first arm portion and the second arm portion than to the facing side edge portions, respectively.

Advantageous Effects of Invention

According to the hose clamp of the present invention, a structure can be implemented in which engagement portions that maintain the plate spring body in the state where the diameter of the plate spring body is expanded are provided on the pair of tab portions, and the engagement portions do not exist on the arm portions of the plate spring body. At the same time, a structure can be implemented in which the engagement portions are provided on the tab portions, at positions closer to the side edge portions being opposite to the facing side edge portions of the overlap portions of the arm portions than to the facing side edge portions, and the engagement portions do not protrude from the facing side edge portions of the overlap portions. Therefore, when a diameter of the plate spring body is reduced, the overlap portions of the arm portions can be disposed close to each other in the axial direction of the plate spring body, so that a gap between the facing inner side edge portions of the overlap portions can be reduced, and the performance of sealing between the hose fastened and fixed by the hose clamp and a pipe or the like can be improved.

DESCRIPTION OF EMBODIMENTS

Hereinafter, a first embodiment of a hose clamp according to the present invention will be described with reference to FIGS. 1 to 14.

Figure 1:
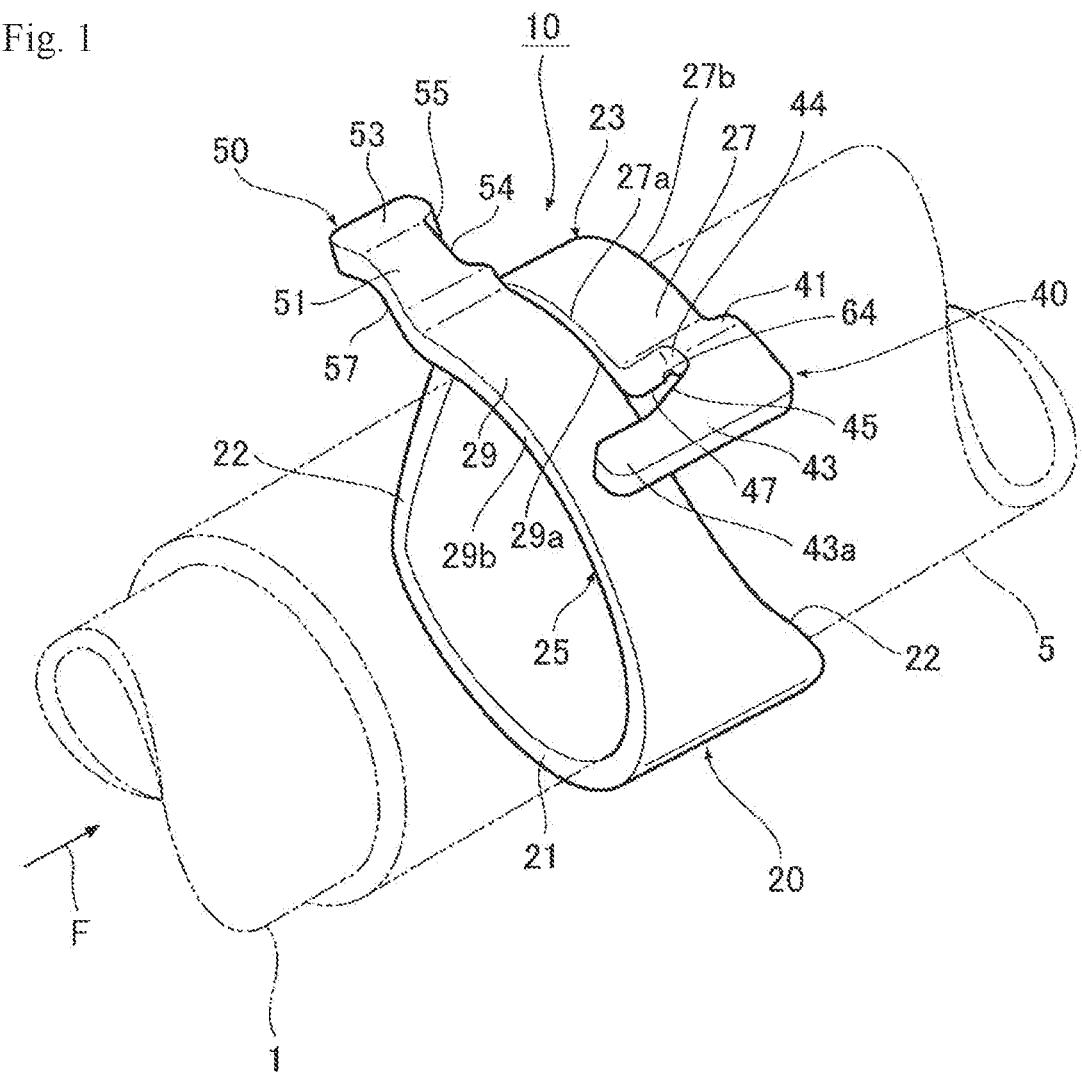
FIG. 1 is a perspective view illustrating a first embodiment of a hose clamp in a state where a diameter of the hose clamp is reduced according to the present invention.

For example, various types of pipings are arranged inside an automobile or the like, and a flexible hose made of a material such as rubber is employed to connect these pipings. As illustrated in FIG. 1, a hose clamp 10 (hereinafter, referred to as "clamp 10") of the present invention is disposed on an outer periphery of a hose 5 covering one end portion of a piping 1 such as a pipe or a tube, and is used for fixing the hose 5 to the piping 1 by fastening the outer periphery of the hose 5.

Figure 4:
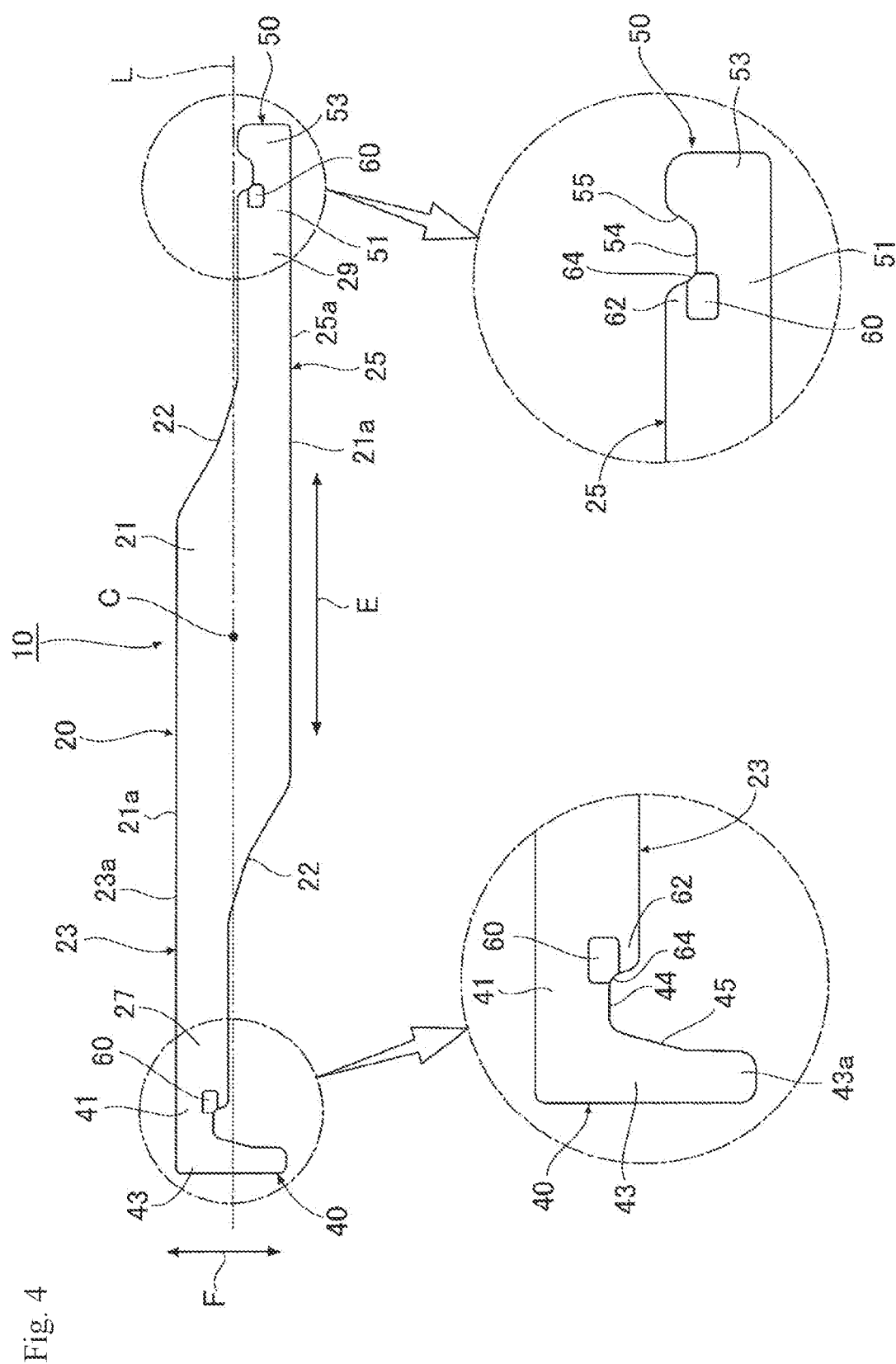
FIG. 4 is a developed view of the hose clamp.

As illustrated in FIG. 1, the clamp 10 according to this embodiment is formed by punching a band-like metal plate as illustrated in FIG. 4 into a predetermined shape and bending the metal plate. The clamp 10 has a plate spring body 20 that is curved in an annular shape and that is to be attached so as to surround the outer periphery of the hose 5, a first tab portion 40 that is provided at one end portion of the plate spring body 20 in a circumferential direction thereof, and a second tab portion 50 that is provided at the other end portion of the plate spring body 20 in the circumferential direction. The plate spring body 20 and the pair of tab portions 40 and 50 are integrally formed of a metal material such as stainless steel or spring steel.

As illustrated in FIGS. 1 to 4, the plate spring body 20 has a base portion 21 that extends by a predetermined length along the circumferential direction of the hose 5, a first arm portion 23 that extends from one side in an axial direction F (see FIG. 4) at one end side in a circumferential direction E (see FIG. 4) of the base portion 21, and a second arm portion 25 that extends from the other side in the axial direction F at the other end side in the circumferential direction E of the base portion 21. In other words, the arm portions 23 and 25 are provided at positions that are point-symmetrical with respect to a center C (see FIG. 4) of the base portion 21. The axial direction F of the base portion 21 is a direction (also referred to as a width direction) orthogonal to the circumferential direction E of the base portion 21, and means the same direction as a direction along an axial center of the hose 5 or the piping 1 fastened and fixed by the clamp 10. In addition, the circumferential direction E and the axial direction F are the same for the plate spring body 20 and the pair of tab portions 40 and 50.

Figure 2:
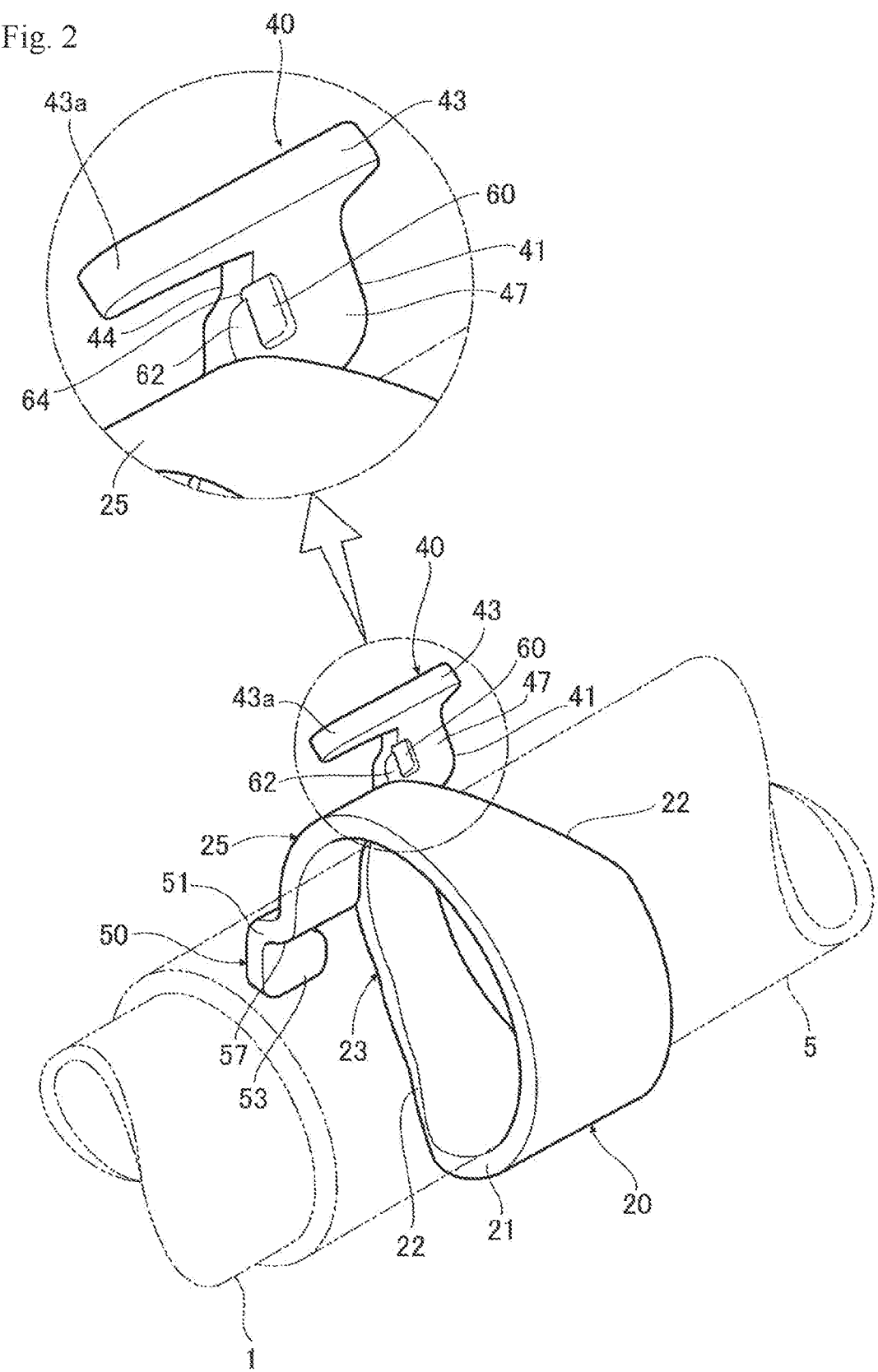
FIG. 2 is a perspective view of the hose clamp in a state where the diameter of the hose clamp is reduced in a case of being viewed from a direction different from that in FIG. 1.
Figure 3:
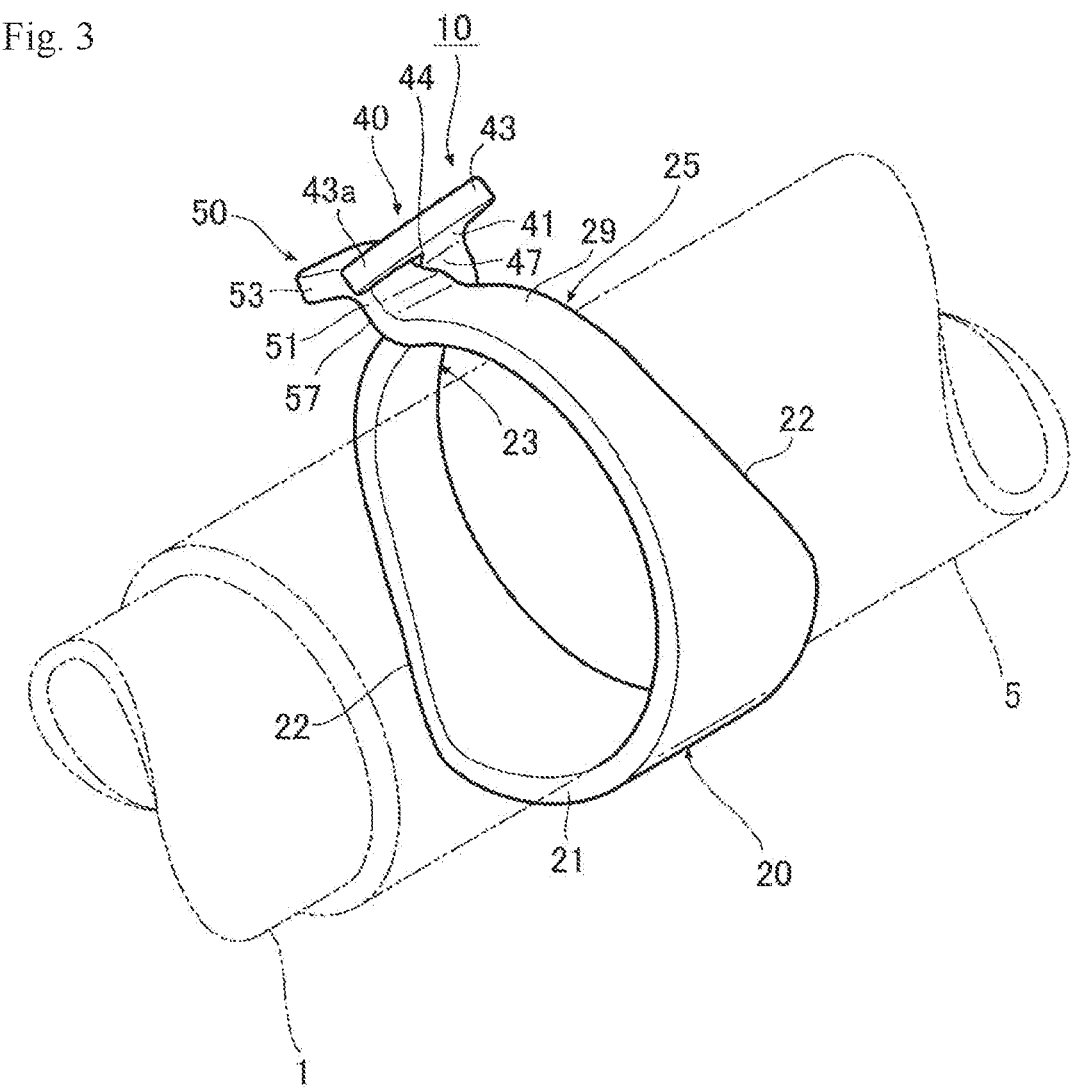
FIG. 3 is a perspective view of the hose clamp in a state where the diameter of the hose clamp is expanded.
Figure 5:
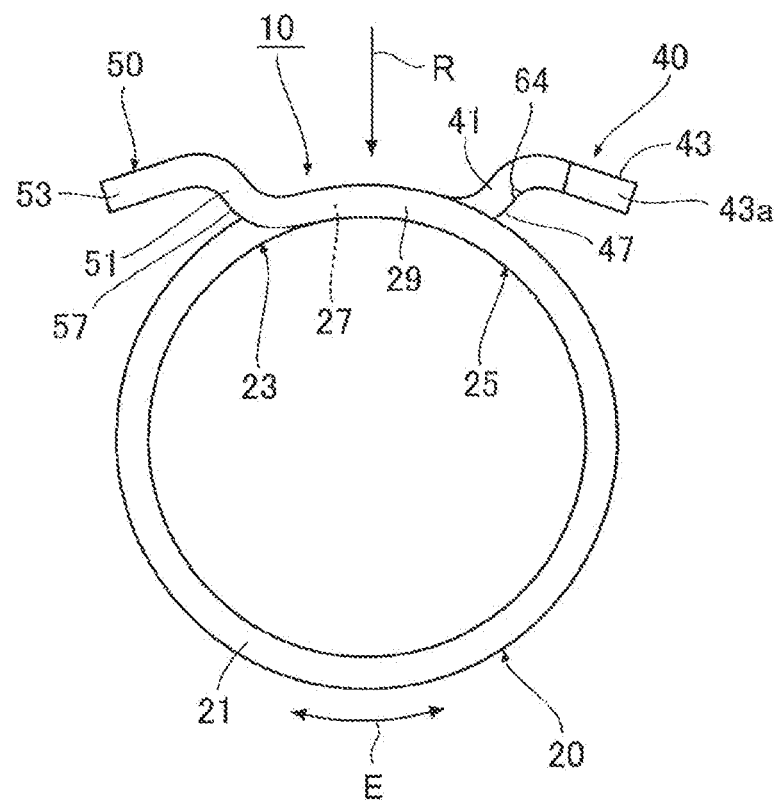
FIG. 5 is a front view of the hose clamp in a state where the diameter of the hose clamp is reduced.
Figure 9:
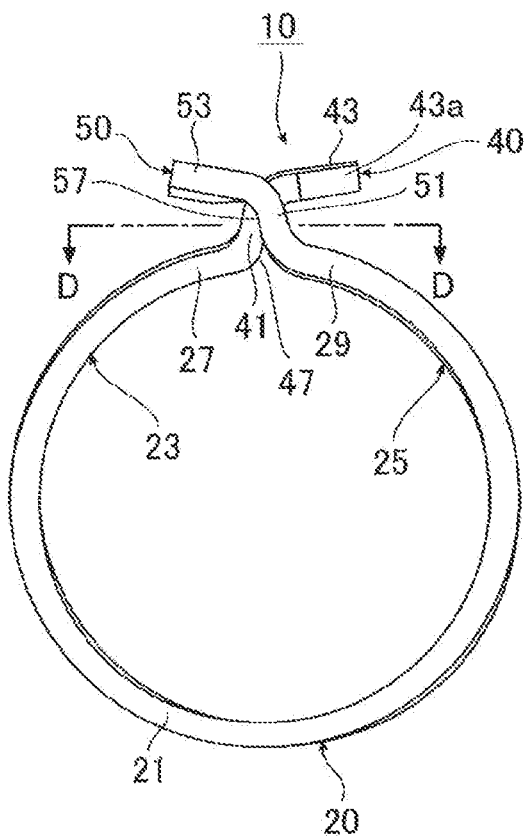
FIG. 9 is a front view of the hose clamp in a state where the diameter of the hose clamp is expanded.

The plate spring body 20 is in a free state where a diameter of the plate spring body 20 is reduced when the pair of tab portions 40 and 50 are separated, as illustrated in FIGS. 1, 2, 5, and the like, and expands in diameter against an elastic force when the pair of tab portions 40 and 50 are brought close to each other, as illustrated in FIGS. 3, 9, and the like.

As illustrated in FIG. 4, the first arm portion 23 and the second arm portion 25 extend at a constant width that is narrower than a length from a side edge portion 21a of the base portion 21 to a central line L (line along a center of the base portion 21 in the axial direction F). Further, the arm portions 23 and 25 extend from the base portion 21 with the same width. As illustrated in FIG. 4, outer edge portions 23a and 25a of the arm portions 23 and 25 are linearly continuous (on the same plane) with respect to both side edge portions 21a and 21a of the base portion 21 so as not to have a step, a notch, or the like.

Further, in the base portion 21, tapered portions 22 where the base portion 21 narrows gradually are formed on the other side in the axial direction F in one end side in the circumferential direction E, and on one side in the axial direction F in the other end side in the circumferential direction E. The tapered portions 22 relax an abrupt change in stress distribution from the base portion 21 to arm portions 23 and 25.

Although the arm portions 23 and 25 in this embodiment are formed with the same width, for example, one arm portion may be formed to be narrower or wider than the other arm portion, as long as the arm portions may be provided within a range of a plate width (length along the axial direction F) of the base portion.

Figure 6:
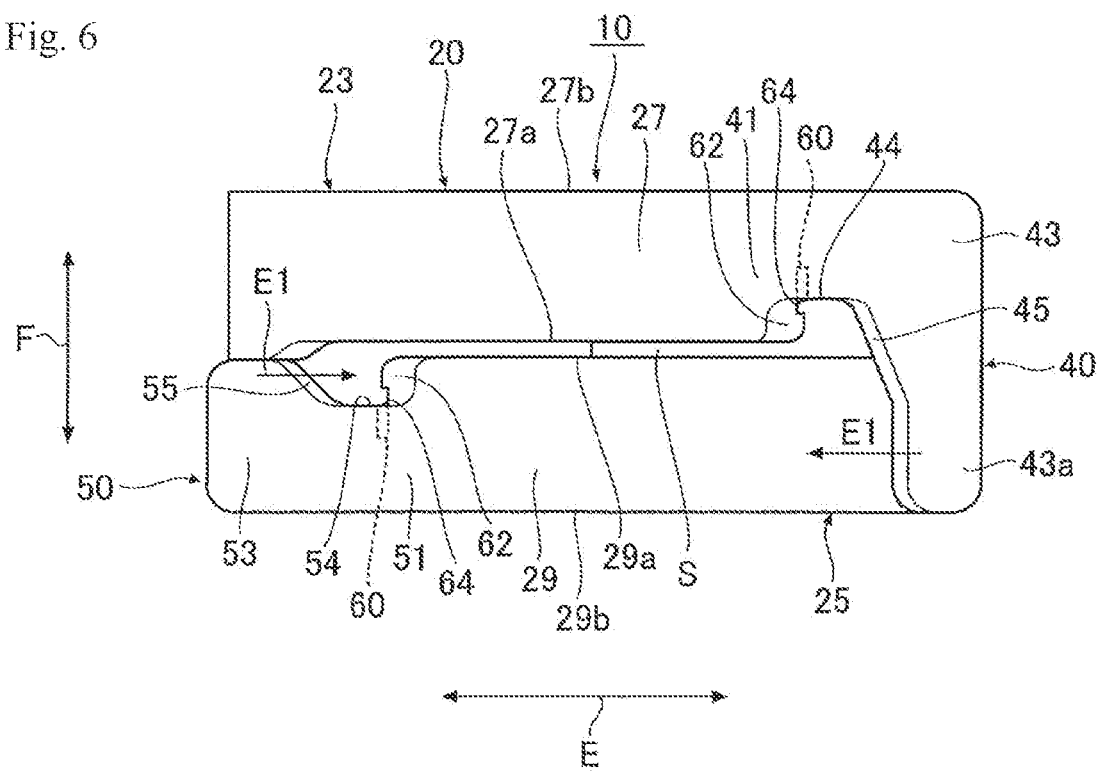
FIG. 6 is a plan view of the hose clamp in a state where the diameter of the hose clamp is reduced.

In addition, a first overlap portion 27 and a second overlap portion 29 are formed at tip end sides in an extending direction of the first arm portion 23 and the second arm portion 25, respectively. Further, as illustrated in FIG. 5, in a free state where the diameter of the plate spring body 20 is reduced, the first overlap portion 27 and the second overlap portion 29 are configured such that the tip end sides of the first arm portion 23 and the second arm portion 25 in the extending direction overlap with each other in the circumferential direction E of the plate spring body 20 as viewing the plate spring body 20 from the axial direction F (see FIG. 1), and such that as illustrated in FIG. 6, the tip end sides of the first arm portion 23 and the second arm portion 25 in the extending direction do not overlap with each other in the axial direction F of the plate spring body 20 as viewing the plate spring body 20 from a radial direction R (see FIG. 5). The radial direction refers to a direction directing from a radially outer side of the clamp toward an axial center of the clamp, or a direction directing from the axial center of the clamp toward the radially outer side of the clamp.

In the free state where the diameter of the plate spring body 20 is reduced, as illustrated in FIG. 6, the overlap portions 27 and 29, which overlap with each other in the circumferential direction of the plate spring body 20 and do not overlap with each other in the axial direction F, are displaced in the axial direction F of the plate spring body 20 and are arranged adjacent to each other so that inner side edge portions 27a and 29a thereof (facing side edge portions) face each other. The inner side edge portions 27a and 29a of the overlap portions 27 and 29 refer to side edge portions, of the overlap portions 27 and 29, close to a center of the plate spring body 20 in the axial direction F. In this embodiment, the facing inner side edge portions 27a and 29a of the overlap portions 27 and 29 extending from the base portion 21 at a constant width are arranged parallel to each other, and a gap S having a constant width is formed between the inner side edge portions 27a and 29a along the circumferential direction F of the plate spring body 20. Side edge portions opposite to the inner side edge portions 27a and 29a of the overlap portions 27 and 29 in the axial direction F are set as outer side edge portions 27b and 29b.

Further, the pair of tab portions 40 and 50 provided at both end portions of the plate spring body 20 in the circumferential direction are bent and extend outward in the radial direction of the plate spring body 20, from tip ends of the first arm portion 23 and the second arm portion 25 in the extending direction. The pair of tab portions 40 and 50 is a portion to be gripped by a tool (not shown) such as pliers or pincers, a clamp diameter-expanding device, or the like.

As illustrated in FIGS. 1, 5, 9, and the like, the first tab portion 40 in this embodiment has a bent portion 41 and an operating portion 43. The bent portion 41 is bent at a predetermined angle, and extends from the tip end of the first arm portion 23 in the extending direction so as to rise outward in the radial direction (outer diameter direction) of the plate spring body 20. The operating portion 43 is bent from a tip end of the bent portion 41 so as to be folded back inward in the radial direction (inner diameter direction) of the plate spring body 20.

Figure 10:
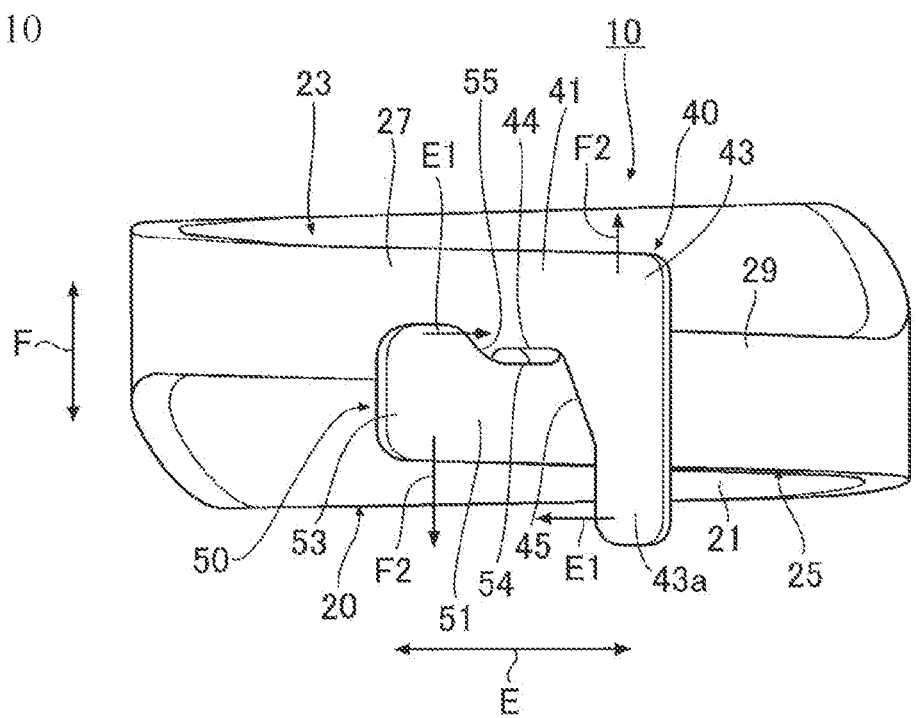
FIG. 10 is a plan view of the hose clamp in a state where the diameter of the hose clamp is expanded.
Figure 12:
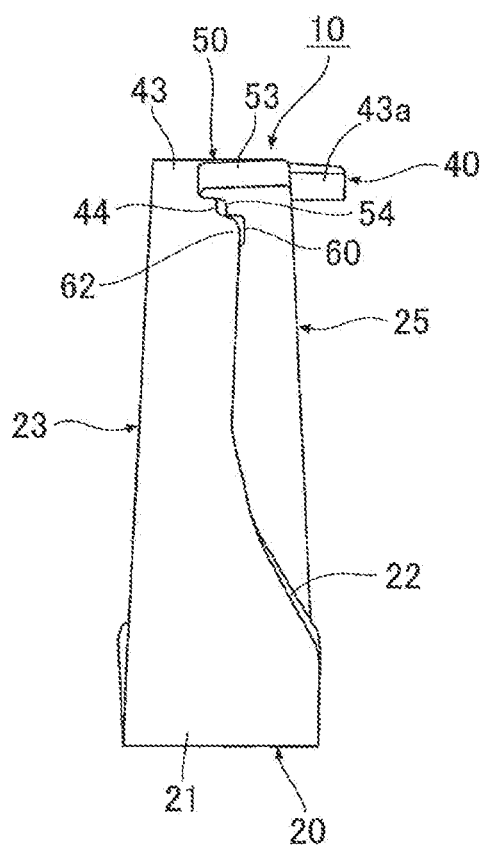
FIG. 12 is a side view of the hose clamp in a state where the diameter of the hose clamp is expanded.

As illustrated in FIG. 6, a tip end portion 43a of the operating portion 43 extends along the axial direction F of the plate spring body 20 toward a side of the second arm portion 25 provided with the second tab portion 50. The operating portion 43 is provided with a length allowing the operation portion 43 to fit in a plate width of the plate spring body 20 (see FIG. 6) in a free state where the diameter of the plate spring body 20 is reduced, and to protrude from one side edge portion of the plate spring body 20 in the axial direction F, as illustrated in FIGS. 10 and 12, in a state where the diameter of the plate spring body 20 is expanded.

As illustrated in FIGS. 4 and 6, a cutout portion 44 is provided at one side portion close to the second tab portion 50, that is, an inner side portion in the axial direction F, of the bent portion 41. Further, at an inner side portion of the first tab portion 40 in the axial direction F (one side portion close to the second tab portion 50), an inclined portion 45 is formed that gradually widens from the cutout portion 44 toward the tip end of the first arm portion 23 in the extending direction.

On the other hand, as illustrated in FIGS. 1, 5, 9, and the like, the second tab portion 50 in this embodiment has a bent portion 51 and an operating portion 53. The bent portion 51 is bent at a predetermined angle, and extends from the tip end of the second arm portion 25 in the extending direction so as to rise outward in the radial direction of the plate spring body 20. The operating portion 53 is bent from a tip end of the bent portion 51 so as to be folded back inward in the radial direction of the plate spring body 20.

As illustrated in FIGS. 4 and 6, a cutout portion 54 is provided at one side portion close to the first tab portion 40, that is, an inner side portion in the axial direction F, of the bent portion 51. Further, at an inner side portion of the second tab portion 50 in the axial direction F (one side portion close to the first tab portion 40), an inclined portion 55 is formed that gradually widens from the cutout portion 54 toward the tip end of the second arm portion 25 in the extending direction.

Figure 14:
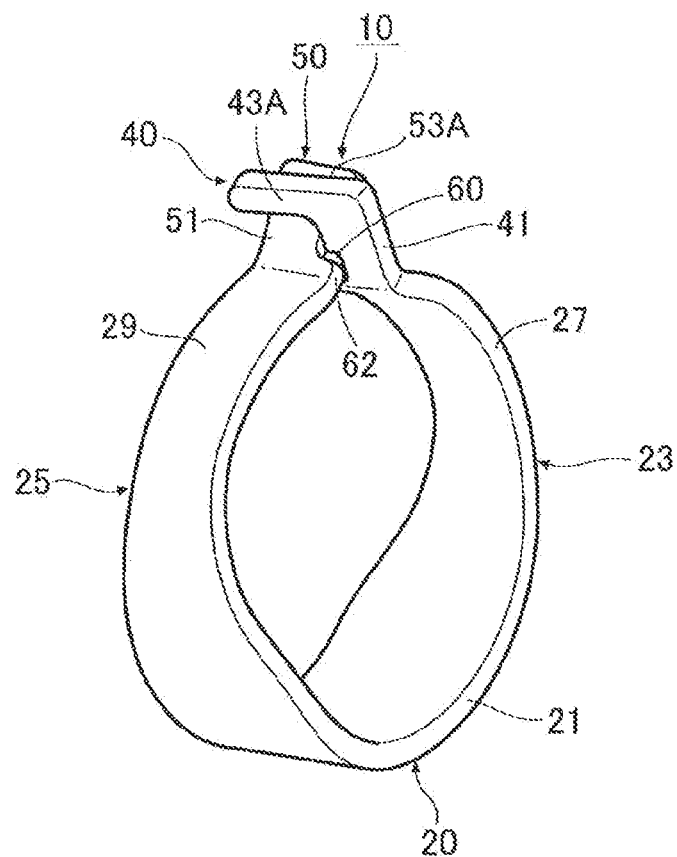
FIG. 14 is a perspective view for illustrating other shape of a pair of tab portions in the hose clamp.

The pair of tab portions is not limited to the above shapes. For example, as illustrated in FIG. 14, the tab portions may have a shape in which operating portions 43A and 53A of the respective tab portions 40 and 50 extend from the bent portions 41 and 51 without being bent so as to be folded back with respect to the bent portions 41 and 51, as long as the tab portions can be gripped by a tool such as pliers or pincers.

When the pair of tab portions 40 and 50 are moved close to each other in the circumferential direction E of the plate spring body 20, and are deflected and deformed by being moved close to each other in the axial direction F of the plate spring body 20, from a free state where the pair of tab portions 40 and 50 are separated from each other in the circumferential direction E and the diameter of the plate spring body 20 is reduced as illustrated in FIGS. 1, 5, and 6, a surface 47 (inner surface opposite to an outer surface close to an outer peripheral surface of the first arm portion 23) of the bent portion 41 of the first tab portion 40 and a surface 57 (inner surface opposite to an outer surface close to an outer peripheral surface of the second arm portion 25) of the bent portion 51 of the second tab portion 50 are disposed to face each other in a predetermined range, as illustrated in FIGS. 3 and 7 to 9.

As described above, in a state where the pair of tab portions 40 and 50 are brought close to each other in the circumferential direction E and in the axial direction F, engagement portions that hold the plate spring body 20 in a state where the diameter of the plate spring body 20 is expanded are respectively provided on the surfaces 47 and 57 of the pair of tab portions 40 and 50, which face each other (hereinafter, simply referred to as "facing surface 47" and "facing surface 57").

Figure 8A:
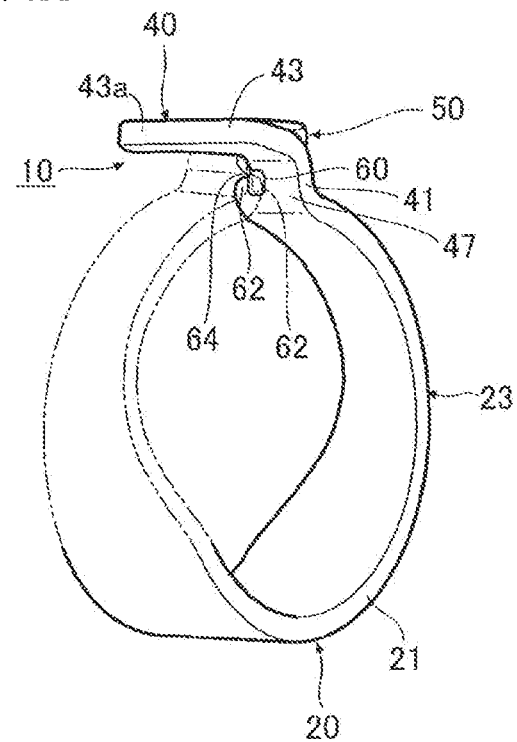
FIG. 8A is a perspective view taken along an arrow A in FIG. 7.
Figure 8B:
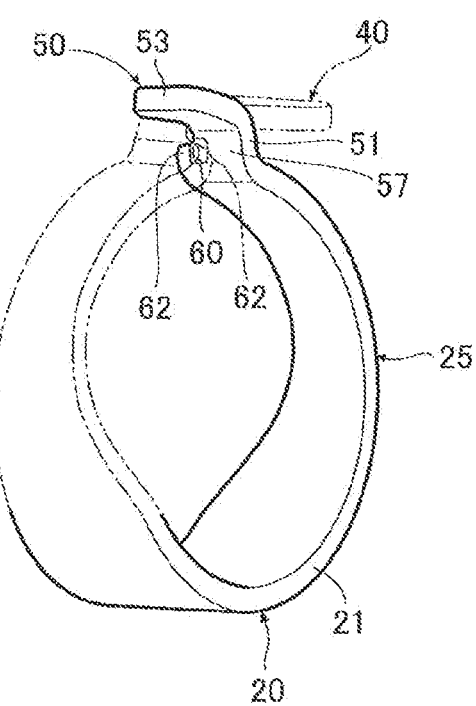
FIG. 8B is a perspective view taken along an arrow B in FIG. 7.
Figure 11:
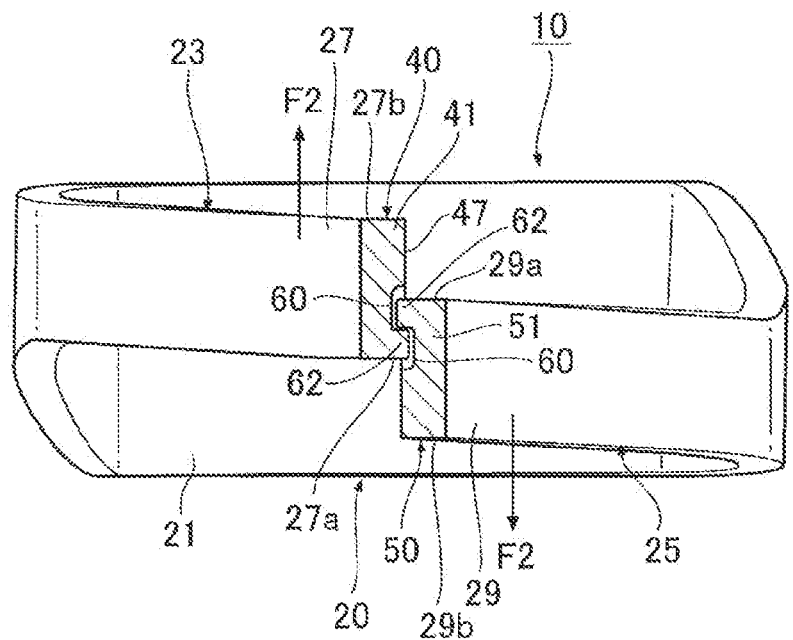
FIG. 11 is a cross-sectional view taken along a line D-D in FIG. 9.

In this embodiment, as illustrated in FIGS. 8A and 8B, the engagement portions of the pair of tab portions 40 and 50 have recesses 60 and 60, respectively, and each peripheral edge portion of the recesses 60 and 60 constitutes a protrusion 62 that is to be engaged with and disengaged from the recess 60 of the mating side, thus making a structure of recess/protrusion fitting (see FIG. 11). Referring also to FIG. 2, on the facing surface 47 of the first tab portion 40 and the facing surface 57 of the second tab portion 50, the recesses 60 having a substantially rectangular concave shape are provided respectively, with a predetermined depth so as not to penetrate the respective tab portions 40 and 50. Peripheral edge portions, of the recesses 60, on the inner side edge portion 27a side constitute the protrusions 62 that extend in a protruding manner along the extending direction of the respective bent portions 41 and 51 of the tab portions 40 and 50. Further, the protrusions 62 do not protrude from the respective facing surfaces 47 and 57 of the tab portions 40 and 50.

As illustrated in FIG. 6, as viewing the plate spring body 20 from the radial direction R, the engagement portions (the recesses 60 and the protrusions 62) are provided on the tab portions 40 and 50, at positions closer to the outer side edge portions 27b and 29b being opposite to the facing inner side edge portions 27a and 29a of the overlap portions 27 and 29 of the first arm portion 23 and the second arm portion 25 in the axial direction F than to the facing inner side edge portions 27a and 27a. Further, in a free state where the diameter of the plate spring body 20 is reduced, the engagement portions (the recesses 60 and the protrusions 62) provided on the tab portions 40 and 50 are formed to be displaced from each other in the axial direction F of the plate spring body 20 (see FIG. 6).

Figure 13:
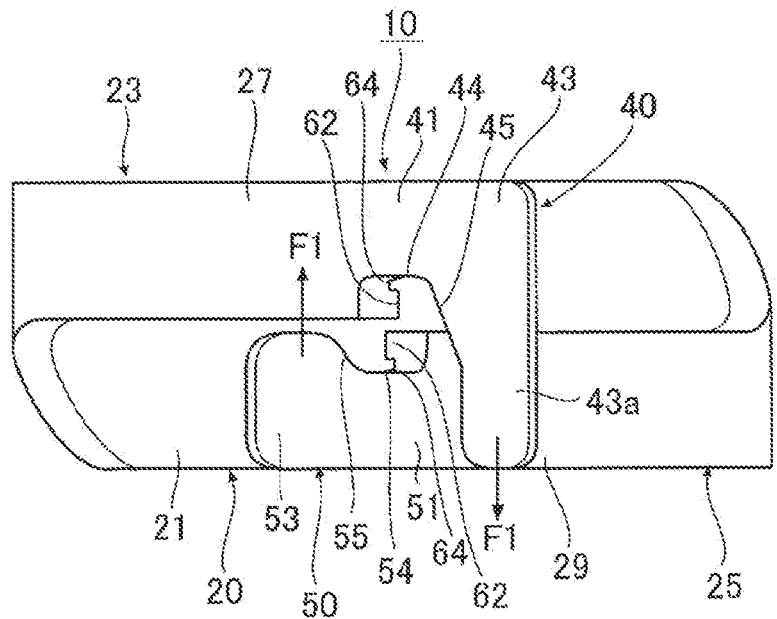
FIG. 13 is an illustrative plan view illustrating a state where a diameter of a hose clamp is about to be expanded from a state where the diameter of the hose clamp is reduced.

Further, in order to hold the plate spring body 20 in a state where the diameter of the plate spring body 20 is expanded, as indicated by arrows E1 and E1 in FIG. 6, the pair of tab portions 40 and 50 are brought close to each other in the circumferential direction E of the plate spring body 20 to expand the diameter of the plate spring body 20 as illustrated in FIG. 13. From this state, as indicated by arrows F1 and F1 in FIG. 13, the tab portions 40 and 50 are side-shifted, deflected and deformed so as to be brought close to each other in the axial direction F of the plate spring body 20, and the recesses 60 and the protrusions 62 of the tab portions 40 and 50 overlap with each other in the axial direction F. Then, the protrusion 62 of the second tab portion 50 enters the recess 60 of the first tab portion 40 through an opening 64, and the protrusion 62 of the first tab portion 40 enters the recess 60 of the second tab portion 50 through an opening 64. As a result, as illustrated in FIG. 11, the protrusions 62 are engaged with inner peripheral edges of the recesses 60 respectively and the protrusions 62 enter the recesses 60 respectively. Accordingly, the protrusions 62 are held so as not to come out of the recesses 60, the recesses 60 and the protrusions 62 are recess/protrusion fitted, and the plate spring body 20 is held in a state where the diameter of the plate spring body 20 is expanded against an elastic restoring force.

In the clamp 10, since the engagement portions for holding the plate spring body 20 in the state where the diameter of the plate spring body 20 is expanded are not provided on the plate spring body 20 but in the pair of tab portions 40 and 50 formed in a bent manner in the plate spring body 20, in a state where the plate spring body 20 is held so that the diameter of the plate spring body 20 is expanded by engaging the engagement portions of the pair of tab portions 40 and 50, the pair of arm portions 23 and 25 of the plate spring body 20 do not overlap with each other in the circumferential direction E as viewing the plate spring body 20 from the axial direction F, as illustrated in FIG. 9.

Since the engagement portions of the tab portions 40 and 50 are formed to be displaced from each other in the axial direction F of the plate spring body 20, and are engaged in a state where the tab portions 40 and 50 are deflected and deformed by being brought close to each other in the axial direction F, elastic restoring forces applies in directions to separate the tab portions 40 and 50 from each other in the axial direction F, as indicated by arrows F2 and F2 in FIG. 11. Accordingly, the protrusions 62 engage with inner peripheral edges on the inner side edge portions 27a and 29a side of the overlap portions 27 and 29 of the recesses 60.

Figure 7:
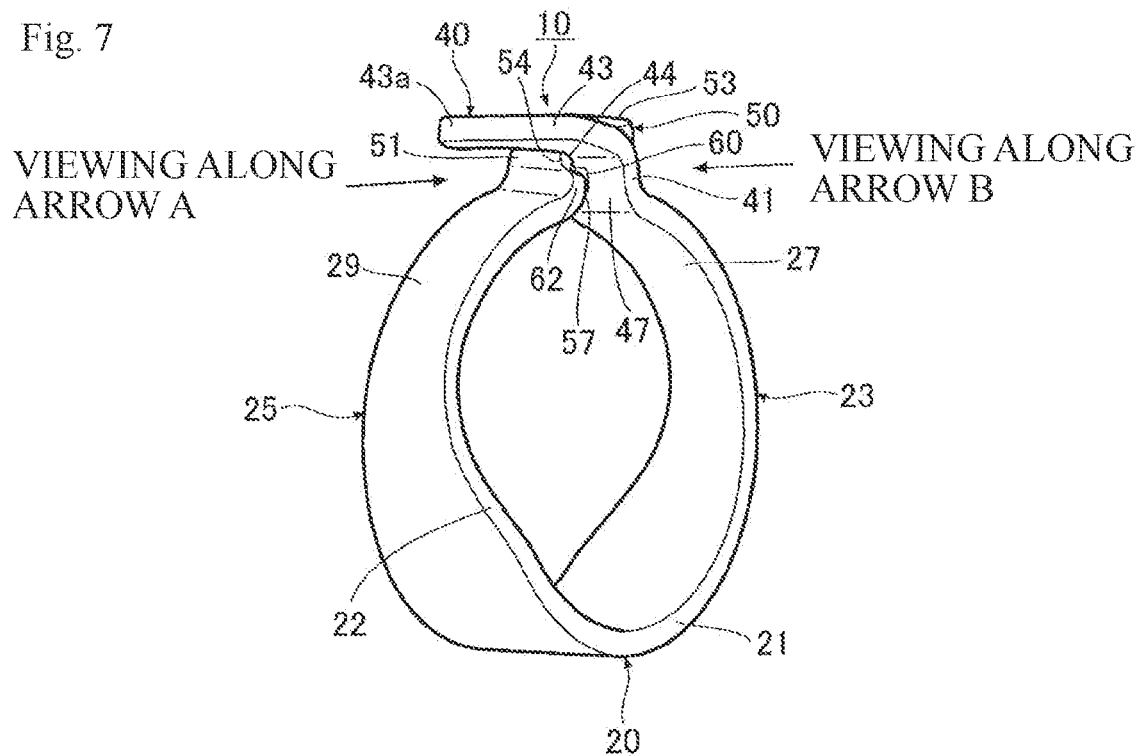
FIG. 7 is a perspective view of the hose clamp in a state where the diameter of the hose clamp is expanded.

In this embodiment, at the time of bringing the pair of tab portions 40 and 50 close to each other in the circumferential direction E to expand the diameter of the plate spring body 20 and bringing the pair of tab portions 40 and 50 close to each other in the axial direction F of the plate spring body 20 to engage the engagement portions with each other, since the cutout portions 44 and 54 are provided at the inner side portions of the tab portions 40 and 50 in the axial direction F respectively, the engagement portions engage with each other in a state where the cutout portions 44 and 54 enter each other as illustrated in FIGS. 7 and 10.

At the time of reducing the diameter of the plate spring body 20 from the state where the plate spring body 20 is held so that the diameter of the plate spring body 20 is expanded, the tab portions 40 and 50 are brought close to each other in the circumferential direction E by gripping the operating portions 43 and 53 of the tab portions 40 and 50 by a tool such as pliers or pincers. Then, the protrusion 62 of the second tab portion 50 side comes out of the recess 60 of the first tab portion 40 side through the opening 64 of the first tab portion 40 side, and the protrusion 62 of the first tab portion 40 side comes out of the recess 60 of the second tab portion 50 side through the opening 64 of the second tab portion 50 side, thereby releasing the engagement between the engagement portions. At this time, since the engagement portions provided on the tab portions 40 and 50 are formed to be displaced from each other in the axial direction F of the plate spring body 20, and are engaged in a state where the tab portions 40 and 50 are deflected and deformed by being brought close to each other in the axial direction F, the engagement portions take to positions not overlapping with each other in the axial direction F due to the elastic restoring forces of the tab portions 40 and 50 when the engagement between the engagement portions is released. In this state, a tool such as pliers or pincers is opened to separate the tab portions 40 and 50 from each other in the circumferential direction E, so that the diameter of the plate spring body 20 can be reduced.

In this embodiment, since the inclined portions 45 and 55 are formed in the first tab portion 40 and the second tab portion 50 respectively, at the time of bringing the tab portions 40 and 50 close to each other in the circumferential direction E by gripping the operating portions 43 and 53 of the tab portions 40 and 50 using a tool such as pliers or pincers in order to reduce the diameter of the plate spring body 20 from an expanded diameter holding state as described above, the bent portion 51 of the second tab portion 50 abuts on the inclined portion 45 of the first tab portion 40 to guide the second tab portion 50 in a direction (see arrow F2 in FIG. 10) opposite to a deflection direction thereof, and the bent portion 41 of the first tab portion 40 abuts on the inclined portion 55 of the second tab portion 50 to guide the first tab portion 40 in a direction (see arrow F2 in FIG. 10) opposite to a deflection direction thereof. By adopting such a configuration, it is possible to improve workability in reducing the diameter of the plate spring body 20 from the expanded diameter holding state. In particular, occurrence that the protrusion 62 enters the recess 60 again after being extracted from the recess 60 can be prevented, thereby enhancing diameter reduction workability of the clamp 10.

Although as the engagement portion in this embodiment, a structure is set in which the recess 60, the protrusion 62, and the like are provided, for example, the engagement portion may be a structure having a through hole penetrating, the tab portion instead of having the recess, or a structure in which only one tab portion is provided with the recess or through hole and the other tab portion is provided with the protrusion (such structures will be described in an embodiment to be described later). The structure of the engagement portion is not particularly limited as long as the structure allows the engagement portions provided on tab portions to engage with each other and allows to hold the state where the diameter of the plate spring body is expanded.

Next, a procedure of fastening and fixing a flexible hose 5 made of a material such as rubber to the piping 1 such as a pipe by using the clamp 10 having the above configuration will be described.

First, from a state where the pair of tab portions 40 and 50 are separated from each other in the circumferential direction E and the diameter of the plate spring body 20 is reduced as illustrated in FIGS. 1 and 2, the tab portions 40 and 50 are gripped by a tool such as pliers or pincers to be brought close to each other in the circumferential direction E to expand the diameter of the plate spring body 20 (see FIG. 13), and from this state, further the tab portions 40 and 50 are deflected and deformed by being brought close to each other in the axial direction F (see arrow F1 in FIG. 13), so that the recesses 60 and the protrusions 62 of the tab portions 40 and 50 overlap with each other in the axial direction F. Then, the cutout portions 44 and 54 of the tab portions 40 and 50 enter each other, the protrusions 62 and 62 of the tab portions 40 and 50 of the mating side enter the recesses 60 of the tab portions 40 and 50 respectively through the openings 64 and 64, and the protrusions 62 engage with the inner peripheral edges of the recesses 60 respectively (see FIG. 11). As a result, as illustrated in FIGS. 3 and 7, the plate spring body 20 can be held in a state where the diameter of the plate spring body 20 is expanded.

Next, after the clamp 10 in a state where the diameter of the clamp 10 is expanded is disposed on an outer periphery of the hose 5 attached to an outer periphery of one end portion of the piping 1, the operating portions 43 and 53 of the tab portions 40 and 50 are gripped by an appropriate tool to bring the tab portions 40 and 50 close to each other in the circumferential direction E. Then, since the protrusions 62 of the tab portions 40 and 50 of the mating side pass from the openings 64 of the tab portions 40 and 50, and the protrusions 62 and 62 of the tab portions 40 and 50 of the mating side come out of the recesses 60 and 60 of the tab portions 40 and 50, the engagement between the engagement portions is released. At the same time, the bent portions 41 and 51 of the tab portions 40 and 50 of the mating side abut on the inclined portions 45 and 55 of the tab portions 40 and 50, the tab portions 40 and 50 are respectively guided in directions opposite to the deflection directions thereof (see arrows F2 and F2 in FIG. 10), and the engagement portions of the tab portions 40 and 50 take to positions not overlapping with each other in the axial direction F. In this state, the diameter of the plate spring body 20 is reduced by separating the tab portions 40 and 50 in the circumferential direction F, and thus the hose 5 can be fastened and fixed to the piping 1 as illustrated in FIGS. 1 and 2.

Further, in the clamp 10, since the engagement portions (recesses 60 and protrusions 62 in this case) that hold the plate spring body 20 in the state where the diameter of the plate spring body 20 is expanded are provided on the pair of the tab portions 40 and 50, a structure can be implemented in which the engagement portions do not exist in the arm portions 23 and 25 of the plate spring body 20. Meanwhile, since the engagement portions are provided on the tab portions 40 and 50, at positions closer to the outer side edge portions 27b and 29b being opposite to the facing inner side edge portions 27a and 29a of the overlap portions 27 and 29 in the axial direction F than to the facing inner side edge portions 27a and 29a, a structure can be implemented in which the engagement portions do not protrude in the axial direction F of the plate spring body 20 from the inner side edge portions 27a and 29a of the overlap portions 27 and 29. Therefore, as illustrated in FIG. 6, when the diameter of the plate spring body 20 is reduced, the overlap portions 27 and 29 are disposed in the arm portions 23 and 25 so as to be close to each other in the axial direction F of the plate spring body 20, so that the gap S between the facing inner side edge portions 27a and 29a of the overlap portions 27 and 29 can be made as small as possible. As a result, it is possible to improve performance of sealing between the hose 5 fastened and fixed by the clamp 10 and the piping 1.

In this embodiment, the engagement portion of one tab portion (both tab portions 40 and 50 in this case) has the recess 60, and the other engagement portion provided on the other tab portion (tab portions 50 and 40 of the mating side) has the protrusion 62 that is to be engaged with and disengaged from the recess 60. Therefore, the protrusion of other tab portion is engaged with the recess of the one tab portion, here, the protrusion 62 of the second tab portion 50 is engaged with the recess 60 of the first tab portion 40 or the protrusion 62 of the first tab portion 40 is engaged with the recess 60 of the second tab portion 50, so that the plate spring body 20 can be held in the state where the diameter of the plate spring body 20 is expanded. At this time, since the protrusion 62 enters the recess 60, the protrusion 62 can be made difficult to get out from the recess 60, and the state where the diameter of the plate spring body 20 is expanded can be held more reliably. Further, since the recess 60 can be formed by press molding or hollow molding, forming of the engagement portion is easier as compared with a case where the engagement portion is formed by cutting and raising, or the like. Even when the engagement portion has a through hole instead of the recess, the same effect as the above-described effect can be obtained.

Further, in this embodiment, the opening 64 through which the cutout portions 44 and 54 communicate with the recess 60 is provided on at least one of the tab portions (both tab portions 40 and 50 in this case), and at the time of engaging the engagement portions with each other in order to expand the diameter of the plate spring body 20, the protrusion 62 of the other tab portion (both tab portions 40 and 50 in this case) pass through the opening 64 and enter the recess 60. Therefore, the protrusion 62 provided on the other tab portion side can be formed in a protruding manner not protruding from a surface in a thickness direction of the tab portion, and the protrusion 62 can be easily formed. When the protrusion 62 is to be inserted into the recess 60 in a case where the opening 64 is not provided, it is essential to configure the protrusion 62 to protrude from the surface in the thickness direction of the tab portion, which makes it difficult to form the protrusion 62. Even when the engagement portion has a through hole instead of the recess, the same effect as the above-described effect can be obtained.

Further, in this embodiment, the cutout portions 44 and 54 are provided on the pair of tab portions 40 and 50 respectively. At the time of expanding the diameter of the plate spring body 20, the cutout portions 44 and 54 enter each other and the engagement portions provided on the pair of tab portions 40 and 50 engage with each other. Therefore, as illustrated in FIG. 13, in a state where the diameter of the plate spring body 20 is expanded by bringing the pair of tab portions 40 and 50 close to each other in the circumferential direction E, a movement amount of the pair of tab portions 40 and 50 at the time of bringing the pair of tab portions 40 and 50 close to each other in the axial direction F as indicated by arrows F1 and F1 in FIG. 13, can be increased. As a result, since amounts of deflection and deformation of the pair of tab portions 40 and 50 or the arm portions 23 and 25 can be increased, it is possible to smoothly reduce the diameter of the plate spring body 20 at the time of reducing the diameter of the plate spring body 20 by releasing the engagement between the engagement portions.

Further, in this embodiment, the engagement portions of the pair of tab portions 40 and 50 have the recesses 60 and 60 respectively, and the peripheral edge portion of each recess 60 constitutes the protrusion 62. Therefore, at the time of engaging the engagement portions of the pair of tab portions 40 and 50 by bringing the pair of tab portions 40 and 50 close to each other in the axial direction F, in a state where the diameter of the plate spring body 20 is expanded by bringing the pair of tab portions 40 and 50 close to each other in the circumferential direction E from a state where the diameter of the plate spring body 20 is reduced, the protrusion 62 of one engagement portion enters the recess 60 of the other engagement portion and the protrusion 62 of the other engagement portion enters the recess 60 of one engagement portion, so that the recesses 60 and the protrusions 62 of the engagement portions are recess/protrusion fitted with each other as illustrated in FIG. 11. Thus, a holding force for holding the plate spring body 20 in the state where the diameter of the plate spring body 20 is expanded can be further increased.

Figure 15:
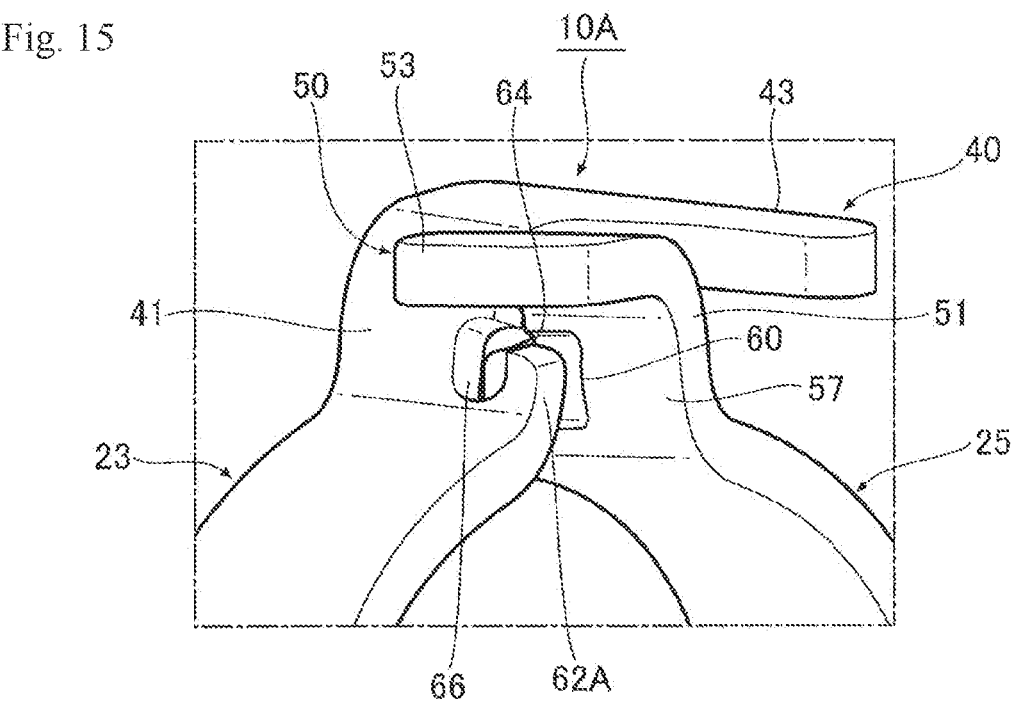
FIG. 15 is an enlarged perspective view of a main part of a hose clamp in a state where the diameter of the hose clamp is expanded according to a second embodiment of the present invention.
Figure 16A:
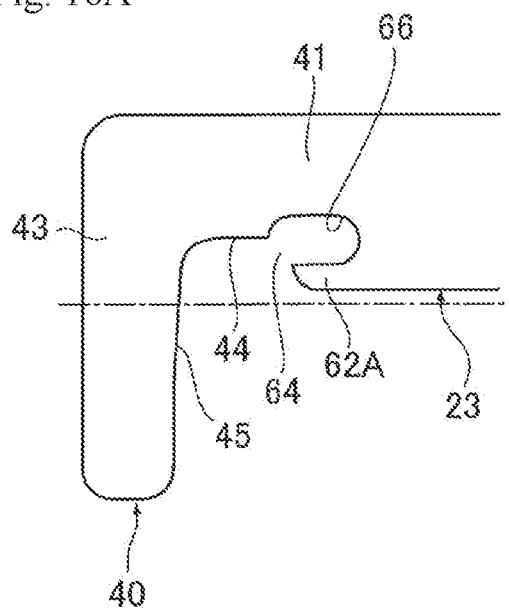
FIG. 16A is an enlarged plan view of a main part of a first tab portion of the hose clamp.
Figure 16B:
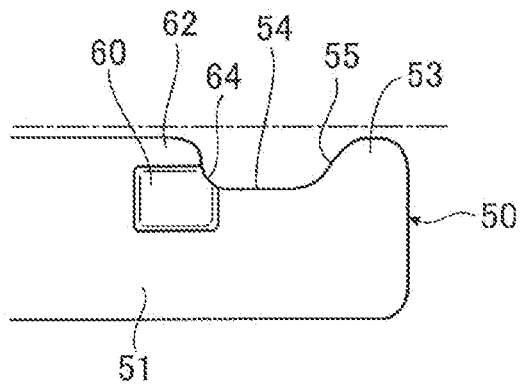
FIG. 16B is an enlarged plan view of a main part of a second tab portion of the hose clamp.

FIGS. 15, 16A and 16B illustrate a second embodiment of a hose clamp according to the present invention. Substantially the same parts as those in the above-described embodiment are denoted by the same reference signs, and description thereof will be omitted.

A structure of the engagement portions provided on the pair of tab portions 40 and 50 of a hose clamp 10A (hereinafter, referred to as "clamp 10A") of this embodiment is different from that of the above embodiment.

That is, as illustrated in FIGS. 15 and 16A, the engagement portion of the first tab portion 40 side has a through hole 66 penetrating the first tab portion 40 over a thickness thereof, while the engagement portion of the second tab portion 50 side has the same recess 60 as in the above embodiment (see FIG. 16B). The through hole 66 of the first tab portion 40 and the cutout portion 44 are communicated with each other by the opening 64. Further, a peripheral edge portion of the through hole 66 of the first tab portion 40 side constitutes a protrusion 62A that is to be engaged with and disengaged from the recess 60 of the second tab portion 50 side.

In this embodiment, by engaging the protrusion 62A of the first tab portion 40 with the recess 60 of the second tab portion 50, the plate spring body 20 can be held in the state where the diameter of the plate spring body 20 is expanded (see FIG. 15). On the other hand, by extracting the protrusion 62A of the first tab portion 40 from the recess 60 of the second tab portion 50, the diameter of the plate spring body 20 can be reduced.

Figure 17:
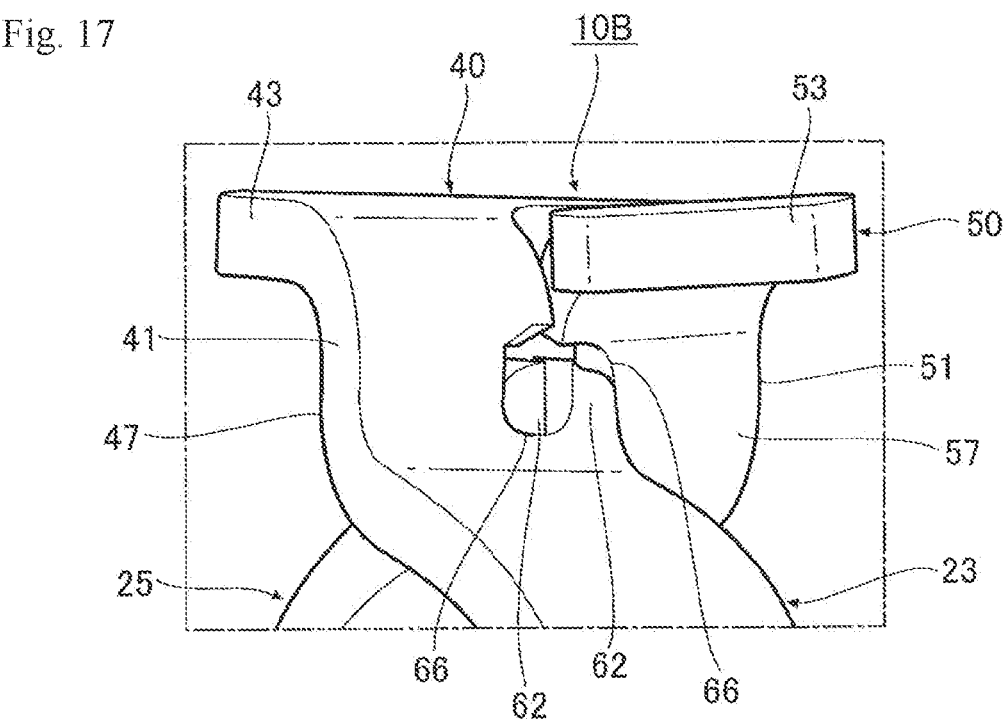
FIG. 17 is an enlarged perspective view of a main part of a hose clamp in a state where the diameter of the hose clamp is expanded according to a third embodiment of the present invention.
Figure 18A:
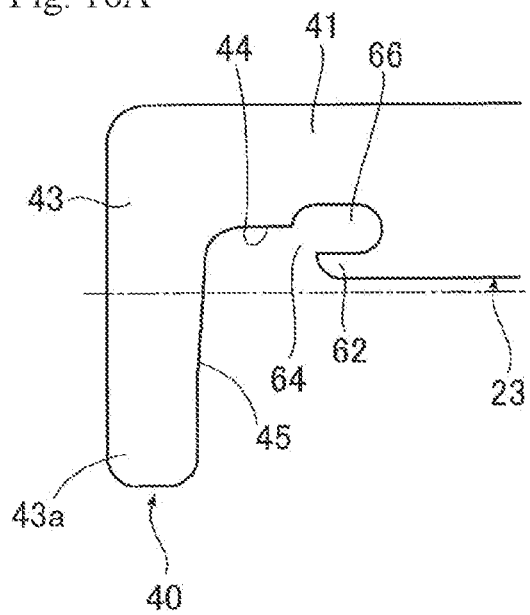
FIG. 18A is an enlarged plan view of a main part of a first tab portion of the hose clamp.
Figure 18B:
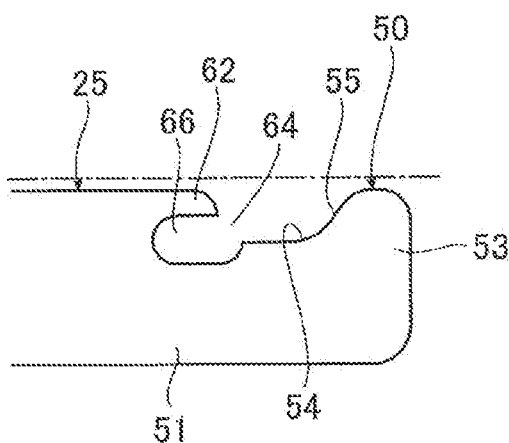
FIG. 18B is an enlarged plan view of a main part of a second tab portion of the hose clamp.

FIGS. 17, 18A and 18B illustrate a third embodiment of a hose clamp according to the present invention. Substantially the same parts as those in the above-described embodiment are denoted by the same reference signs, and description thereof will be omitted.

A structure of the engagement portions provided on the pair of tab portions 40 and 50 of a hose clamp 10B (hereinafter, referred to as "clamp 10B") of this embodiment is different from those of the above embodiments.

That is, as illustrated in FIGS. 17, 18A and 18B, the engagement portions of the tab portions 40 and 50 respectively have through holes 66 penetrating the tab portions 40 and 50, and peripheral edge portions thereof constitute the protrusions 62 and 62. Further, the protrusions 62 and 62 of the tab portions 40 and 50 pass through the openings 64 and 64 to enter the through holes 66 and 66 of the tab portions 50 and 40 of the mating side respectively, and the protrusions 62 and 62 engage with each other, so that the plate spring body 20 can be held in the state where the diameter of the plate spring body 20 is expanded (see FIG. 17). On the other hand, by extracting the protrusions 62 and 62 of the tab portions 50 and 40 of the mating side from the through holes 66 and 66 of the tab portions 40 and 50, respectively, it is possible to reduce the diameter of the plate spring body 20.

Figure 19:
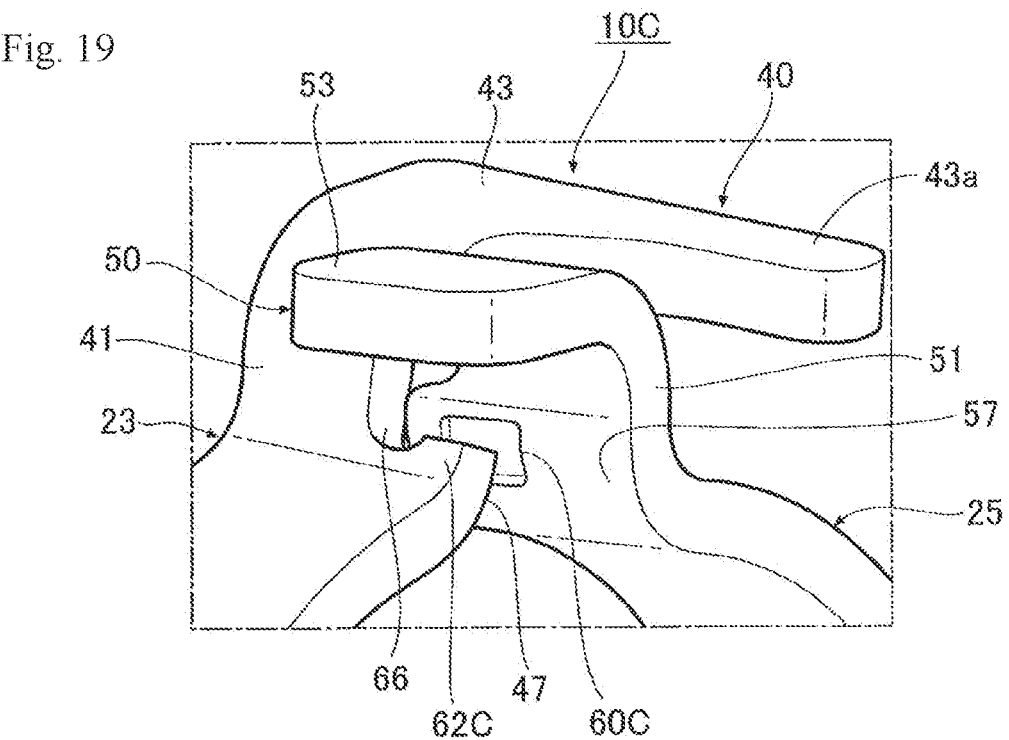
FIG. 19 is an enlarged perspective view of a main part of a hose clamp in a state where the diameter of the hose clamp is expanded according to a fourth embodiment of the present invention.
Figure 20A:
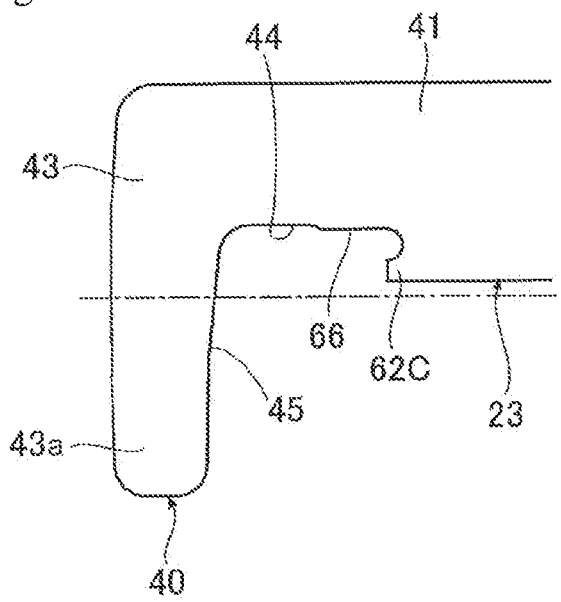
FIG. 20A is an enlarged plan view of a main part of a first tab portion of the hose clamp.
Figure 20B:
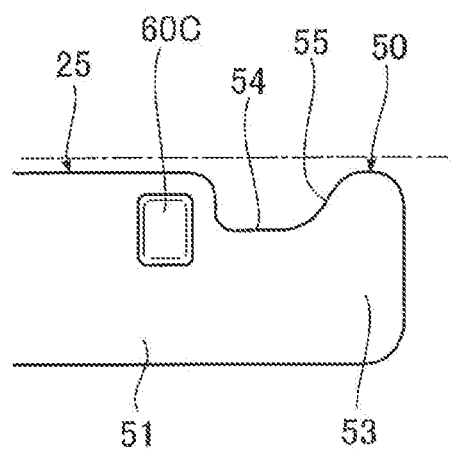
FIG. 20B is an enlarged plan view of a main part of a second tab portion of the hose clamp.

FIGS. 19, 20A and 20B illustrate a fourth embodiment of a hose clamp according to the present invention. Substantially the same parts as those in the above-described embodiment are denoted by the same reference signs, and description thereof will be omitted.

A structure of the engagement portions provided on the pair of tab portions 40 and 50 of a hose clamp 10C (hereinafter, referred to as "clamp 10C") of this embodiment is different from those of the above embodiments.

That is, as illustrated in FIGS. 19 and 20A, the engagement portion of the first tab portion 40 side has the through hole 66 penetrating the first tab portion 40 over a thickness thereof, while the engagement portion of the second tab portion 50 side has a recess 60C. However, the recess 60C has a shape not having the opening 64, which allows the recess 60C to communicate with the cutout portion 54 as the recess 60 in the first and second embodiments. A peripheral edge portion of the through hole 66 of the first tab portion 40) side constitutes a protrusion 62C that is to be engaged with and disengaged from the recess 60C of the second tab portion 50 side. The protrusion 62C is shorter than the protrusion 62A in the second embodiment.

In this embodiment, by engaging the protrusion 62C of the first tab portion 40 with the recess 60C of the second tab portion 50, the plate spring body 20 can be held in the state where the diameter of the plate spring body 20 is expanded (see FIG. 19). On the other hand, by extracting the protrusion 62C of the first tab portion 40 from the recess 60C of the second tab portion 50, the diameter of the plate spring body 20 can be reduced.

The present invention is not limited to the embodiments described above. Various modified embodiments are possible within the gist of the present invention, and such embodiments are also included in the scope of the present invention.

REFERENCE SIGNS LIST 10, 10A, 10B, IOC hose clamp (clamp)
20 plate spring body
21 base portion
23 first arm portion
25 second arm portion
27 first overlap portion
27a inner side edge portion
27b outer side edge portion
29 second overlap portion
29a inner side edge portion
29b outer side edge portion
40 first tab portion
44 cutout portion
47 facing surface
50 second tab portion
54 cutout portion
57 facing surface
60, 60C recess
62, 62A, 62C protrusion
64 opening
66 through hole

The invention claimed is:

1. A hose clamp, comprising:
a plate spring body that is curved in an annular shape and that is to be attached so as to surround an outer periphery of a hose; and
a pair of tab portions that are provided at both end portions of the plate spring body in a circumferential direction,
wherein a diameter of the plate spring body is reduced when the pair of tab portions are separated from each other and is expanded when the pair of tab portions are brought towards each other,
wherein the plate spring body has a base portion that extends by a predetermined length along a circumferential direction of the hose, a first arm portion that extends from one side of the base portion in an axial direction at one end side of the base portion in a circumferential direction, and a second arm portion that extends from the other side of the base portion in the axial direction at the other end side of the base portion in the circumferential direction,
wherein a first overlap portion and a second overlap portion are formed at tip end sides of the first arm portion and the second arm portion in an extending direction respectively, and in a state where the diameter of the plate spring body is reduced, the first overlap portion and the second overlap portion are configured so as to overlap with each other in the circumferential direction of the plate spring body and, as viewing the plate spring body from a radial direction, not to overlap with each other in an axial direction of the plate spring body,
wherein the pair of tab portions are bent and extend outward in the radial direction of the plate spring body, from tip ends of the first arm portion and the second arm portion in the extending direction,
wherein engagement portions are provided on facing surfaces of the pair of tab portions respectively, the engagement portions holding the plate spring body in a state where the diameter of the plate spring body is expanded when the pair of tab portions are brought towards each other in the circumferential direction of the base portion and are brought towards each other in the axial direction of the base portion,
wherein as viewing the plate spring body from the radial direction, the engagement portions are provided in the tab portions, at positions towards side edge portions being opposite to facing side edge portions of the overlap portions of the first arm portion and the second arm portion with respect to the facing side edge portions, respectively,
wherein one engagement portion provided in one tab portion has a recess or a through hole provided on a surface, of the one tab portion, facing the other tab portion,
wherein the other engagement portion provided in the other tab portion has a protrusion that is provided on a surface, of the other tab portion, facing the one tab portion, and that is to be engaged with and disengaged from the recess or the through hole of the one engagement portion,
wherein a cutout portion is provided at one side portion, of at least one tab portion, towards the other tab portion,
wherein an opening through which the cutout portion communicates with the recess or the through hole is provided in the one tab portion provided with the cutout portion, and
wherein when expanding a diameter of the plate spring body and engaging the engagement portions with each other, the protrusion provided on the other tab portion passes through the opening and enters the recess or the through hole.

2. The hose clamp according to claim 1,
wherein the cutout portion is provided in each of the pair of tab portions, and
wherein when expanding the diameter of the plate spring body, the cutout portions enter each other and the engagement portions provided on the pair of tab portions engage with each other.

3. The hose clamp according to claim 2,
wherein each engagement portion of the pair of tab portions has the recess, and a peripheral edge portion of the recess constitutes the protrusion.

* * * * *